(12) United States Patent
Hsu

(10) Patent No.: US 8,089,584 B2
(45) Date of Patent: Jan. 3, 2012

(54) LIQUID CRYSTAL DISPLAY PANEL AND METHOD FOR FABRICATING THE SAME

(75) Inventor: Shih-Feng Hsu, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 301 days.

(21) Appl. No.: 12/613,581

(22) Filed: Nov. 6, 2009

(65) Prior Publication Data

US 2010/0238382 A1  Sep. 23, 2010

(30) Foreign Application Priority Data

Mar. 17, 2009  (TW) ................................ 98108661 A

(51) Int. Cl.
- G02F 1/1334 (2006.01)
- G02F 1/1337 (2006.01)
- G02F 1/13 (2006.01)

(52) U.S. Cl. ............................. 349/86; 349/123; 349/187

(58) Field of Classification Search .................. 349/187, 349/191, 183, 123, 124, 125, 126, 127, 128, 349/129, 130, 131, 132, 135, 86; 438/30; 252/299.01
See application file for complete search history.

(56) References Cited

U.S. PATENT DOCUMENTS

| | | | |
|---|---|---|---|
| 5,831,703 A * | 11/1998 | Nishiguchi et al. ............ | 349/117 |
| 5,942,030 A | 8/1999 | Schuhmacher et al. | |
| 2003/0160210 A1 | 8/2003 | Bremer et al. | |
| 2004/0011996 A1 | 1/2004 | Klasen-Memmer et al. | |
| 2004/0075080 A1 | 4/2004 | Prechtl et al. | |
| 2005/0116200 A1 | 6/2005 | Nakanishi et al. | |
| 2005/0136196 A1 | 6/2005 | Kataoka | |
| 2008/0055521 A1* | 3/2008 | Mizutani et al. ................. | 349/96 |
| 2010/0238382 A1* | 9/2010 | Hsu ................................ | 349/86 |

FOREIGN PATENT DOCUMENTS

CN  1903826 A  1/2007

\* cited by examiner

*Primary Examiner* — Brian Healy

(74) *Attorney, Agent, or Firm* — Rabin & Berdo, P.C.

(57) ABSTRACT

A liquid crystal display (LCD) panel including a lower substrate, an upper substrate and a liquid crystal layer interposed between the upper substrate and the lower substrate is provided. The liquid crystal layer includes at least one liquid crystal molecule and a stabilized alignment polymer, which is polymerized by a plurality of photosensitive monomers and formed on at least one of the surface of the upper substrate or the lower substrate. The photosensitive monomer is represented by the following chemical formula:

$$P_1\text{-}A_1\text{-}(Z_1\text{---}RS\text{---}Z_2\text{-}A_2)_n\text{-}P_2$$

Wherein, $n \geq 1$;

"$P_1$" and "$P_2$" are independently a polymerizable group;

"$A_1$" and "$A_2$" are independently a aryl group;

"$Z_1$" and "$Z_2$" are independently a linking group; and

"RS" is straight-chain or branched-chain alkyl having 1 to 6 carbons or a derivative thereof.

20 Claims, 3 Drawing Sheets

LIQUID CRYSTAL DISPLAY PANEL AND METHOD FOR FABRICATING THE SAME

This application claims the benefit of Taiwan application Serial No. 98108661, filed Mar. 17, 2009, the subject matter of which is incorporated herein by reference.

BACKGROUND OF THE INVENTION

1. Field of the Invention

The invention relates in general to a display panel and a method for fabricating the same, and more particularly to a liquid crystal display (LCD) panel using polymer-stabilizing alignment (PSA) technology and a method for fabricating the same.

2. Description of the Related Art

The liquid crystal display (LCD) panel, having the features of light weight, slimness, low power consumption and low radiation, has been widely used in both the commercial and consumer electronic products. The LCD panel has gradually replaced conventional cathode ray tube (CRT) screen and become a very popular photo-electrical product. The LCD panel currently available is superior to the conventional CRT screen in terms of power consumption, luminance and contrast, but is inferior to the conventional CRT screen in terms of response time.

On the other hand, an alignment technology, that is, the polymer-stabilizing alignment (PSA) technology, is provided in recent years. According to the PSA technology, a plurality of polymerizable monomers are mixed with a liquid crystal layer first, and an energy source such as a UV-light or heat is applied to the liquid crystal layer after the polymerizable monomers were arranged. The polymerizable monomers are polymerized as alignment polymers for guiding the liquid crystal compounds of the LCD panel in alignment.

However, the photosensitive monomer currently available in the market still has a lot to improve, and not all of the polymerizable monomers currently available are suitable with the alignment technology. If the liquid crystal compound and the polymerizable monomers used for fabricating the LCD panel are not suitable with the PSA technology, the LCD panel fabricated by the PSA technology will have an even slower response rate and poorer display quality.

SUMMARY OF THE INVENTION

The invention is directed to a liquid crystal display (LCD) panel and a method for fabricating the same. The LCD panel fabricated according to the method of the invention has fast response and excellent display quality.

According to a first aspect of the present invention, a liquid crystal display (LCD) panel including a lower substrate, an upper substrate and a liquid crystal layer interposed between the upper substrate and the lower substrate is provided. The liquid crystal layer includes at least one liquid crystal molecule. A stabilized alignment polymer polymerized by a plurality of photosensitive monomers is formed on at least one of the surface of the upper substrate or the lower substrate. The photosensitive monomer is represented by the following chemical formula:

$$P_1\text{-}A_1\text{-}(Z_1\text{---}RS\text{---}Z_2\text{-}A_2)_n\text{-}P_2$$

Wherein, $n \geq 1$;
"$P_1$" and "$P_2$" are independently a polymerizable group;
"$A_1$" and "$A_2$" are independently an aryl group;
"$Z_1$" and "$Z_2$" are independently a linking group; and
"RS" is straight-chain or branched-chain alkyl having 1 to 6 carbons or a derivative thereof.

According to a second aspect of the present invention, an LCD panel including a lower substrate, the upper substrate and a liquid crystal material interposed between the upper substrate and the lower substrate is provided. The liquid crystal material includes at least one liquid crystal molecule and the abovementioned photosensitive monomers.

According to a third aspect of the present invention, a method for fabricating an LCD panel is provided. The fabricating method includes the following steps of (a) providing an upper substrate and a lower substrate; (b) interposing a liquid crystal material between the upper substrate and the lower substrate, wherein the liquid crystal material includes a plurality of liquid crystal molecules and a plurality of the abovementioned photosensitive monomers; and (c) forming a stabilized alignment polymer polymerized from the plurality of photosensitive monomers by applying a voltage between the upper substrate and the lower substrate and radiating a light.

The invention will become apparent from the following detailed description of the preferred but non-limiting embodiments. The following description is made with reference to the accompanying drawings.

DETAILED DESCRIPTION OF THE INVENTION

Figure 1A:
FIGS. 1A~1D show a method of fabricating an LCD panel according to a preferred embodiment of the invention.
Figure 1A:

Referring to FIGS. 1A~1D, a method of fabricating an LCD panel according to a preferred embodiment of the invention are shown. The method of fabricating an LCD panel according to a preferred embodiment of the invention includes the following steps. Firstly, an upper substrate 110 and a lower substrate 120 are provided as indicated in FIG. 1A.

Figure 1B:
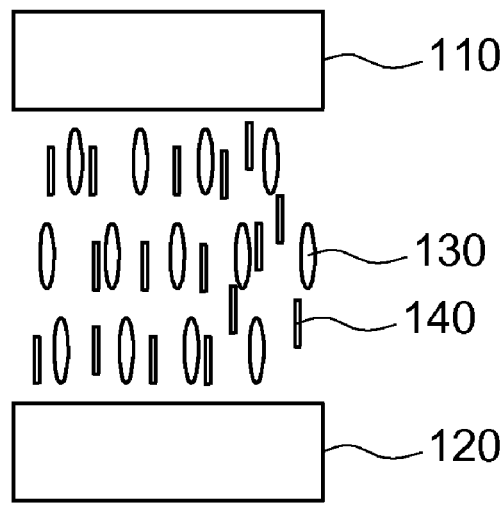

Next, as indicated in FIG. 1B, a liquid crystal material is interposed between the upper substrate 110 and the lower substrate 120. The liquid crystal material includes numerous liquid crystal molecules 130 and numerous photosensitive monomers 140. The photosensitive monomer 140 is represented by chemical formula I:

$$P_1\text{-}A_1\text{-}(Z_1\text{---}RS\text{---}Z_2\text{-}A_2)_n\text{-}P_2 \qquad [I]$$

Wherein, $n \geq 1$.

"$A_1$" and "$A_2$" are independently an aryl group. "$A_1$" and "$A_2$" can be independently selected from biphenyl-4,4'-diyl, thiobiphenyl-4,4'-diyl, biphenyl ether-4,4'-diyl, naphthalene-2,6-diyl, anthracene-2,6-diyl or 1,2-stilbene. The chemical formulas thereof are sequentially disclosed below:

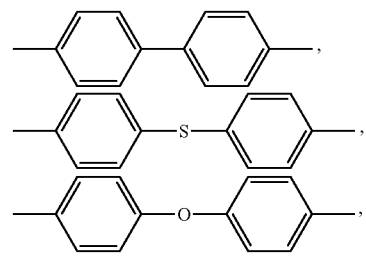

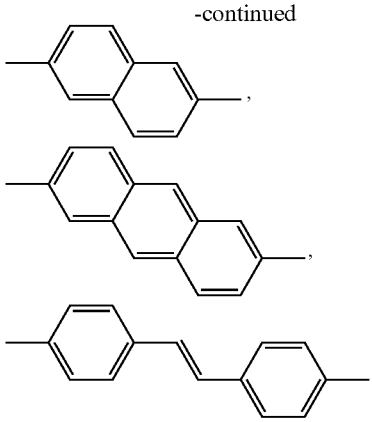

"$Z_1$" and "$Z_2$" are independently a linking group. "$Z_1$" and "$Z_2$" can be independently selected from caroboxyl (—CO—O—, —O—CO—), carbothio(S—CO—, —CO—S—) or amide (—N—CO—, —CO—N—).

"RS" is straight-chain or branched-chain alkyl having 1 to 6 carbons or a derivative thereof, and preferably is non-reactive alkyl. "RS" can be selected from methylene (—$CH_2$—), ethylene (—$CH_2$—$CH_2$—), 1-methylethylene (—$CH(CH_3)CH_2$—) or 1-hydroxy-ethyl (—CH(OH)$CH_2$—).

"$P_1$" and "$P_2$" are independently a polymerizable group. "$P_1$" and "$P_2$" can be independently selected from acrylate, methacrylate, vinyl, vinyloxy, propenyl ether or epoxy.

On the part of chemical formula I as in a preferred embodiment, n=1; "$P_1$" denotes methacrylate; "$A_1$" denotes biphenyl-4,4'-diyl, "$Z_1$" denotes caroboxyl (—CO—O—, —O—CO—); "RS" denotes 1-methylethylene (—$CH(CH_3)CH_2$—); "$Z_2$" denotes caroboxyl (—CO—O—, —O—CO—); "$A_2$" denotes biphenyl-4,4'-diyl; "$P_2$" denotes methacrylate. After above functional groups of the chemical formula I representing the photosensitive monomer 140 of a preferred embodiment of the invention are selected, then chemical formula II can be drawn as below accordingly.

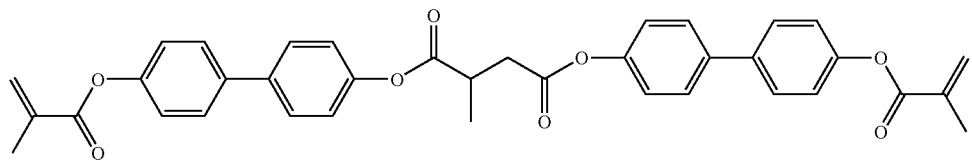

[II]

In a preferred embodiment, the chemical structure of the photosensitive monomer 140 can be represented by chemical formula II, and the synthesis method of the photosensitive monomer is disclosed according to the above exemplification. The synthesis method includes a plurality of continuously chemical reactions disclosed below sequentially.

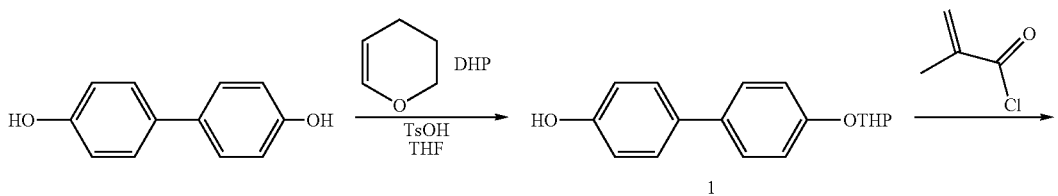

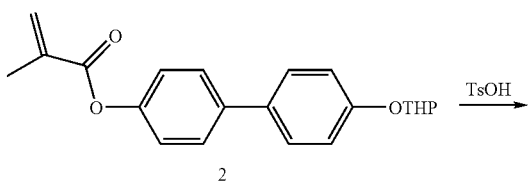

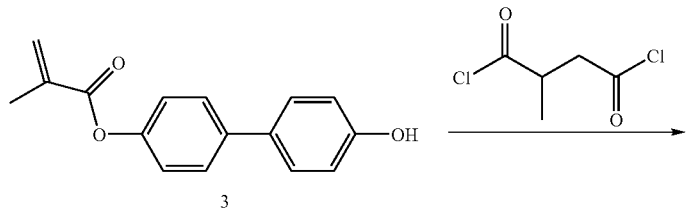

-continued

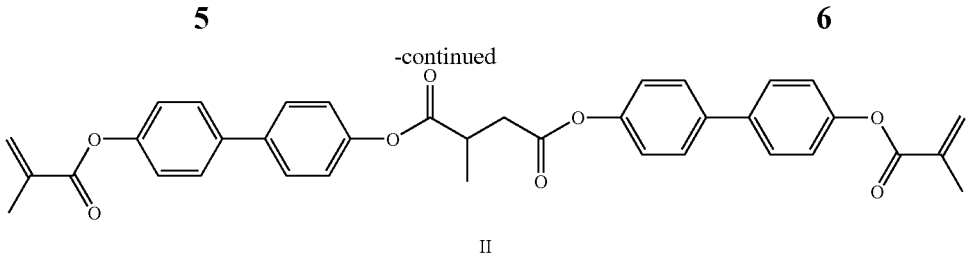

II

Firstly, 5.59 grams (30 millimoles) of 4,4'-dihydroxybiphenyl and 0.21 grams (1.2 millimoles) of p-toluenesulfonic acid (p-TSA) are mixed and dissolved in 50 milliliters of tetrahydrofuran (THF) solution. Next, 1.26 grams (15 millimoles) of 3,4-dihydro-2H-pyran are added to the mixed solution, which is then stirred up at a room temperature, and the reaction is monitored by thin layer chromatography. After one hour, the reaction is quenched by adding EtOH/NH3 mixture, until the solution was slightly basic (pH~8). The mixed solution is extracted thrice by dichloromethane and water solution, and then the organic layer is collected. The organic layer is rinsed with water, salt solution and water solution sequentially, is dried over anhydrous magnesium sulphate (anhydrous $MgSO_4$) and is evaporated under vacuum. The solid thus obtained is then purified by column chromatography (that is, the silica-gel column chromatography using Hexane/EtOAc as elute) to obtain about 3.2 grams as white solid. The yield rate is about 40%. The white solids obtained from purification are 4-hydroxy-4'-((2-tetrahydropyranyl)oxy)biphenyl (i.e., chemical formula 1).

Next, 3.2 grams (11.8 millimoles) of 4-hydroxy-4'-((2-tetrahydropyranyl)oxy)bipheny (i.e., chemical formula 1) are dissolved in 15 milliliters of dry Tetrahydrofuran (dry THF) under a nitrogen environment, and cooled using are ice-bath to 0° C. Then, 1.78 grams (17.7 millimoles) of triethylamine are added to the mixed solution and are together stirred up for 15 minutes. Then, 1.48 grams 14.2 (millimoles) of methacryloyl chloride dissolved in 5 milliliters of dry THF is added to the above reaction solution drop by drop, maintaining the operating temperature be below 10° C. After the testing results of the thin layer chromatography show that the initial material has disappeared, the reaction solution is poured to 50 milliliters of 10% ammonium chloride solution, and is extracted with 25 milliliters of dichloromethane ($CH_2Cl_2$) for three times. The organic layer is collected, dried over anhydrous magnesium sulphate (anhydrous $MgSO_4$) and evaporated under vacuum to obtain 2.4 grams of white solids. The yield rate is about 60%. The obtained white solids are 4-methacryloyloxy-4'-((2-tetrahydropyranyl)oxy)biphenyl (that is, chemical formula 2).

Then, 2.4 grams (7.0 millimoles) of 4-methacryloyloxy-4'-((2-tetrahydropyranyl)oxy)biphenyl (that is, chemical formula 2) and 0.24 grams (1.4 millimoles) of p-TSA are mixed in 15 milliliters of ethanol solution, and together are stirred up for three hours at room temperature. After the testing results of the thin layer chromatography show that the initial material has disappeared, the reaction solution is poured into the water and extracted with 25 milliliters of dichloromethane ($CH_2Cl_2$) for three times. The organic layer is collected, dried over anhydrous magnesium sulphate, rotary evaporated to obtain 1.25 grams of white solids. The yield rate is about 70%. The white solids obtained from purification are 4-hydroxy-4'-methacryloyloxy biphenyl (that is, chemical formula 3).

Then, 1.25 grams (4.92 millimoles) of 4-hydroxy-4'-methacryloyloxy biphenyl (that is, chemical formula 3) are dissolved in 15 milliliters of dry THF, and are ice-bathed and cooled to 0° C. Then, 6.0 grams (60 millimoles) of triethylamine are added to the mixed solution and together are stirred up for 20 minutes under a nitrogen environment. Then, 0.34 grams 2 millimoles of methacryloyl chloride, having been dissolved in 3 milliliter dry THF, are added to the above reaction solution drop by drop, maintaining the operating temperature below 10° C. After the testing results of thin layer chromatography show that the initial material has disappeared, the reaction solution is poured to 50 milliliters of 10% ammonium chloride solution, and the mixed solution is extracted with 20 milliliters of dichloromethane ($CH_2Cl_2$) for three times. The organic layer is collected, dried over anhydrous magnesium sulphate (anhydrous $MgSO_4$) and evaporated under vacuum to obtain white solids. The solids thus obtained is then purified by column chromatography (that is, the silica-gel column chromatography using Hexane/EtOAc as elute). The yield rate is about 70%. Lastly, the final products obtained after a plurality of chemical reactions are the photosensitive monomers (represented by chemical formula II) of the present preferred embodiment.

With regard to the mixture of the liquid crystal material, preferably, the weight of the photosensitive monomers 130 is less than about 10% of the total weight of the liquid crystal material, and more preferably ranges from 0.15% to 0.3% of the total weight of the liquid crystal material.

Figure 1C:
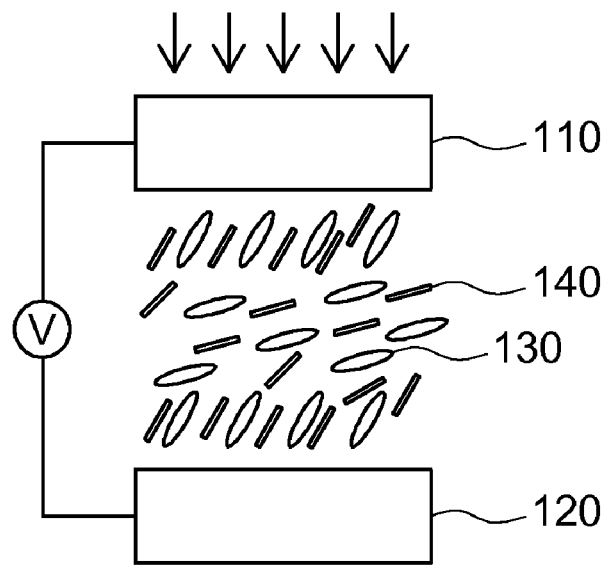

Then, as indicated in FIG. 1C, a voltage is applied between the upper substrate 110 and the lower substrate 120. The intensity of the electrical fields between the substrates affect the span of rotation of the liquid crystal molecules 130, and the liquid crystal molecules 130 then drive the photosensitive monomers 140 to rotate with a pre-tilted angle. Meanwhile, a light is radiated to polymerize photosensitive monomers 140. Preferably, the light can be a UV-light or a blue light, which provides the necessary energy to facilitate polymerization of the monomers to be polymerized.

Figure 1D:
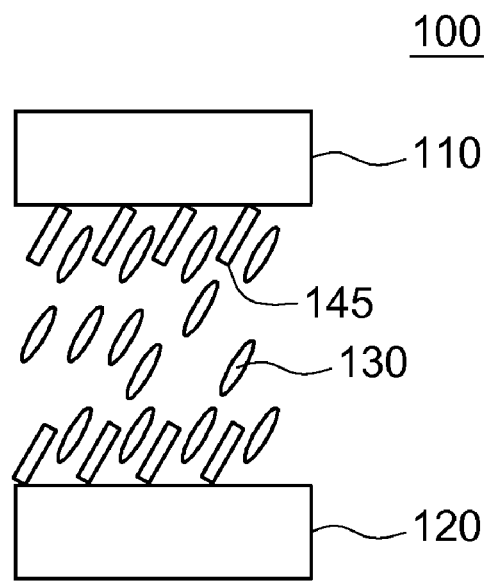

Lastly, the LCD panel 100 is completed as indicated in FIG. 1D. The photosensitive monomers 140, which are polymerized as stabilized alignment polymers 145, have a particular angle of inclination, so the stabilized alignment polymers 145 also have a particular angle of inclination. Despite no voltage is applied, the liquid crystal molecules 130 will still be aligned with the stabilized alignment polymer 145 and tilt to an angle.

The invention further provides an LCD panel 100, which includes an upper substrate 110, a lower substrate 120, a liquid crystal layer and a stabilized alignment polymer 145. The liquid crystal layer is interposed between the upper substrate 110 and the lower substrate 120. The liquid crystal layer includes at least one liquid crystal molecule 130. The stabilized alignment polymer 145, polymerized by numerous photosensitive monomers 140, is formed on one of the surface of the upper substrate 110 or the lower substrate 120, or is formed on both surfaces of the upper substrate 110 and the lower substrate 120. The photosensitive monomers 130 is represented by the following chemical formula:

$$P_1\text{-}A_1\text{-}(Z_1\text{---}RS\text{---}Z_2\text{-}A_2)_n\text{-}P_2$$

Wherein, $n \geq 1$.

"$A_1$" and "$A_2$" are independently a aryl group. "$A_1$" and "$A_2$" can be independently selected from biphenyl-4,4'-diyl, thiobiphenyl-4,4'-diyl, biphenyl ether-4,4'-diyl, naphthalene-2,6-diyl, anthracene-2,6-diyl or 1,2-stilbene.

"$Z_1$" and "$Z_2$" are independently a linking group. "$Z_1$" and "$Z_2$" can be independently selected from caroboxyl (—CO—O—, —O—CO—), carbothio(S—CO—, —CO—S—) or amide (—N—CO—, —CO—N—).

"RS" is straight-chain or branched-chain alkyl having 1 to 6 carbons or a derivative thereof. "RS" can be selected from methylene (—$CH_2$—), ethylene (—$CH_2$—$CH_2$—), 1-methylethylene (—$CH(CH_3)CH_2$—) or 1-hydroxy-ethyl (—CH (OH) $CH_2$—).

"$P_1$" and "$P_2$" are independently a polymerizable group. "$P_1$" and "$P_2$" can be independently selected from acrylate, methacrylate, vinyl, vinyloxy, propenyl ether or epoxy.

On the other hand, the concentration of the photosensitive monomers required by the LCD panel fabricated according the above method is largely decreased without affecting the display characteristics of the display panel. The evidence is verified by the experimental results disclosed below.

Six groups of liquid crystal material are prepared. The photosensitive monomers (represented by chemical formula II) of a preferred embodiment of the invention, which respectively amount to 0.15%, 0.2% and 0.3% of the total weight of liquid crystal material, are used in three experimental groups. The molar concentration of the photosensitive monomers of these three experimental groups, namely, the first experimental group, the second experimental group and the third experimental group, are 0.0025M, 0.0033M and 0.005M, respectively. Conventional photosensitive monomers (represented by chemical formula 5), which respectively amount to 0.15%, 0.2% and 0.3% of the total weight of liquid crystal material, are used in three contrast groups. The molar concentration of the photosensitive monomers of the three contrast groups, namely, the first contrast group, the second contrast group and the third contrast group, are 0.005M, 0.0066M and 0.01 M respectively.

The conventional photosensitive monomer of the contrast group is represented:

[5]

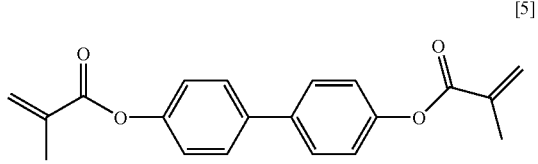

Figure 2:
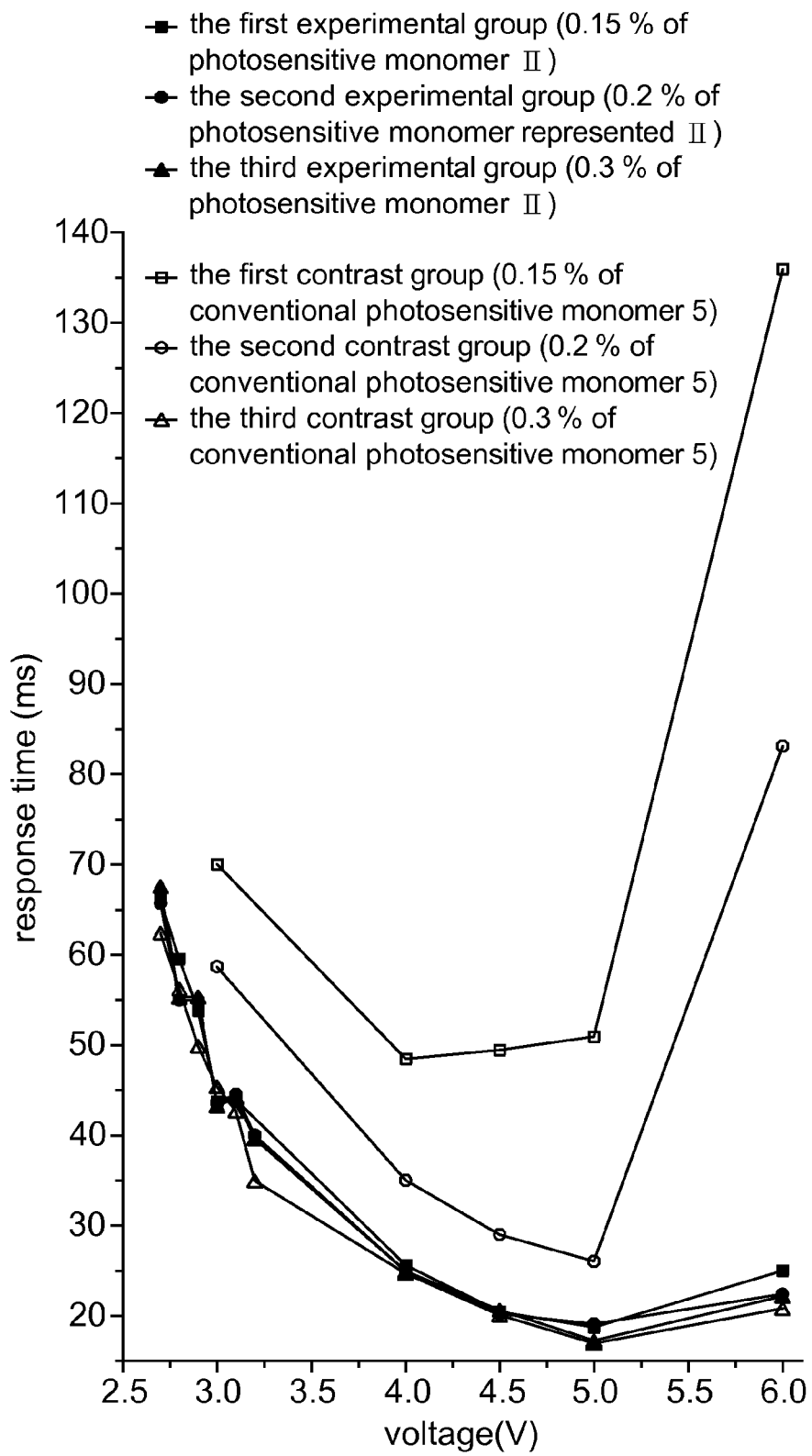
FIG. 2 shows a comparison of response time between an LCD panel of a preferred embodiment of the invention and a conventional LCD panel.

After six groups of liquid crystal material are interposed between two substrates separated by a gap of 3.5 μm, a voltage of 15V is applied to the liquid crystal material, and a 75 Mw/cm² UV-light is radiated on the liquid crystal material for 120 seconds so as to complete six groups of LCD panel. Afterwards, six groups of the LCD panel are respectively tested to measure the response time ($T_{on}$) required for rotating the liquid crystal compound from an initial position to a predetermined position under different driving voltage, and the testing results are illustrated in FIG. 2. In FIG. 2 the horizontal axis denotes the applied voltage (V); the vertical axis denotes the response time (ms). The solid squared data point and the connecting curve thereof denote the experimental data of the first experimental group (0.15% of photosensitive monomer II). The solid circular data point and the connecting curve thereof denote the experimental data of the second experimental group (0.2% of photosensitive monomer II). The solid triangular data point and the connecting curve thereof denote the experimental data of the third experimental group (0.3% of photosensitive monomer II). The hollowed squared data point and the connecting curve thereof denote the experimental data of the first contrast group (0.15% of conventional photosensitive monomer 5). The hollowed circular data point and the connecting curve thereof denote the experimental data of the second contrast group (0.2% of conventional photosensitive monomer 5). The hollowed triangular data point and the connecting curve thereof denote the experimental data of the third contrast group (0.3% of conventional photosensitive monomer 5).

Referring to three contrast groups, in which the concentrations of conventional photosensitive monomer 5 are 0.15%, 0.2% and 0.3%, respectively, the response rate of the LCD panel adopting conventional photosensitive monomer is dramatically varied. If the concentration of the conventional photosensitive monomer 5 is increased or decreased by 0.05% or 0.1%, the response time of the LCD panel is greatly affected. Therefore, in the conventional fabricating process, the mixture of the liquid crystal material must precisely control the concentration of the photosensitive monomer to be 0.3% (the molar concentration is about 0.01 M), so as to produce an LCD panel having a consistent response rate.

Compared with the three experimental groups in which the concentration of the photosensitive monomer also ranges from 0.15% to 0.3% (the molar concentration is about 0.0025M to 0.005M), the response rate of the LCD panel is very consistent. That is, the concentration of the usable photosensitive monomer II has a wider range when using the fabricating method of a preferred embodiment of the invention. The LCD panel being fabricated by adding photosensitive monomer II ranging from 0.15% to 0.3% has fast response and consistent quality.

Moreover, the third contrast group has the fastest response rate among the three contrast groups, and the response rates of three experimental groups within the current range of concentration being set are very close or even superior to the response rate of the third contrast group. Besides, the concentration of the conventional photosensitive monomer 5 of the third contrast group is 0.01 M, and the concentration (ranges from 0.0025M to 0.005M) of the photosensitive monomer II of the experimental group is only a half or even a quarter of that of the third contrast group conventional photosensitive monomer 5. However, the response rate of the LCD panel of the experimental group is very close to that of the third contrast group, and the response time of the LCD panel of the experimental group is even shorter than that of the contrast group when the voltage is low. Thus, the LCD panel fabricated by using the photosensitive monomer of the present preferred embodiment according to the method of fabricating the same has the advantages of fast response and excellent display quality. In addition, to fabricate the LCD panel with the same display quality, the manufacturing process of the present preferred embodiment only uses a quarter to a half dosage of the conventional photosensitive monomer, hence largely saving manufacturing cost.

The LCD panel and the method for fabricating the same disclosed in the above embodiments of the invention have many advantages exemplified below:

1. A wider operating range of the concentration of photosensitive monomer. The fabricating method of a preferred embodiment of the invention allows a wider operating range of the concentration of photosensitive monomer II, and an LCD panel with fast response and consistent quality can be fabricated when the concentration of photosensitive monomer II ranges from 0.15% to 0.3%.

2. A lower concentration of photosensitive monomer. The LCD panel fabricated by using the photosensitive monomer of the present preferred embodiment according to the method for fabricating the same has the advantages of fast response and excellent display quality. In addition, to fabricate the LCD panel with the same display quality, the manufacturing process of the present preferred embodiment only uses a quarter to a half dosage of the conventional photosensitive monomer, hence largely saving manufacturing cost.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A liquid crystal display (LCD) panel, comprising:
   a lower substrate and an upper substrate; and
   a liquid crystal layer comprising at least one liquid crystal molecule and interposed between the upper substrate and the lower substrate;
   a stabilized alignment polymer, being polymerized by a plurality of photosensitive monomers and formed on at least one of the surface of the upper substrate or the lower substrate, wherein the photosensitive monomer is represented by the following chemical formula:

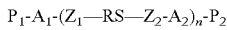

$P_1$-$A_1$-$(Z_1$—RS—$Z_2$-$A_2)_n$-$P_2$ wherein, $n \geq 1$;
   "$P_1$" and "$P_2$" are independently a polymerizable group;
   "$A_1$" and "$A_2$" are independently an aryl group;
   "$Z_1$" and "$Z_2$" are independently a linking group; and
   "RS" is straight-chain or branched-chain alkyl having 1 to 6 carbons or a derivative thereof.

2. The LCD panel according to claim 1, wherein "$P_1$" and "$P_2$" of the photosensitive monomer is independently selected from acrylate, methacrylate, vinyl, vinyloxy, propenyl ether or epoxy.

3. The LCD panel according to claim 1, wherein "RS" of the photosensitive monomer is selected from methylene, ethylene, 1-methylethylene or 1-hydroxy-ethyl.

4. The LCD panel according to claim 1, wherein "$A_1$" and "$A_2$" of the photosensitive monomer is independently selected from biphenyl-4,4'-diyl, thiobiphenyl-4,4'-diyl, biphenyl ether-4,4'-diyl, naphthalene-2,6-diyl, anthracene-2,6-diyl or 1,2-stilbene.

5. The LCD panel according to claim 1, wherein "$Z_1$" and "$Z_2$" of the photosensitive monomer are independently selected from caroboxyl, carbothio or amide.

6. A liquid crystal display (LCD) panel, comprising:
   a lower substrate and an upper substrate; and
   a liquid crystal material interposed between the upper substrate and the lower substrate, the liquid crystal material comprising:
   at least one liquid crystal molecule; and
   a photosensitive monomer represented by the following chemical formula:

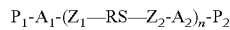

$P_1$-$A_1$-$(Z_1$—RS—$Z_2$-$A_2)_n$-$P_2$ wherein, $n \geq 1$;
   "$P_1$" and "$P_2$" are independently a polymerizable group;
   "$A_1$" and "$A_2$" are independently an aryl group;
   "$Z_1$" and "$Z_2$" are independently a linking group; and
   "RS" is straight-chain or branched-chain alkyl having 1 to 6 carbons or a derivative thereof.

7. The LCD panel according to claim 6, wherein "$P_1$" and "$P_2$" of the photosensitive monomer is independently selected from acrylate, methacrylate, vinyl, vinyloxy, propenyl ether or epoxy.

8. The LCD panel according to claim 6, wherein "RS" of the photosensitive monomer is selected from methylene, ethylene, 1-methylethylene or 1-hydroxy-ethyl.

9. The LCD panel according to claim 6, wherein "$A_1$" and "$A_2$" of the photosensitive monomer is independently selected from biphenyl-4,4'-diyl, thiobiphenyl-4,4'-diyl, biphenyl ether-4,4'-diyl, naphthalene-2,6-diyl, anthracene-2,6-diyl or 1,2-stilbene.

10. The LCD panel according to claim 6, wherein "$Z_1$" and "$Z_2$" of the photosensitive monomer are independently selected from caroboxyl, carbothio or amide.

11. The LCD panel according to claim 6, wherein the weight of the photosensitive monomer is about less than 10% of the total weight of the liquid crystal layer.

12. The LCD panel according to claim 6, wherein the weight of the photosensitive monomer is about 0.15% to 0.3% of the total weight of the liquid crystal layer.

13. A method for fabricating a LCD panel, comprising:
   providing an upper substrate and a lower substrate;
   interposing a liquid crystal material between the upper substrate and the lower substrate, the liquid crystal material comprising a plurality of liquid crystal molecules and a plurality of photosensitive monomers, the photosensitive monomer represented by the following chemical formula:

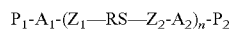

$P_1$-$A_1$-$(Z_1$—RS—$Z_2$-$A_2)_n$-$P_2$ wherein, $n \geq 1$;
   "$A_1$" and "$A_2$" are independently an aryl group;
   "$Z_1$" and "$Z_2$" are independently a linking group;
   "RS" is straight-chain or branched-chain alkyl having 1 to 6 carbons or a derivative thereof; and
   "$P_1$" and "$P_2$" are independently a polymerizable group; and
   forming a stabilized alignment polymer polymerized from the photosensitive monomers by applying a voltage between the upper substrate and the lower substrate and radiating a light.

14. The method according to claim 13, wherein "$P_1$" and "$P_2$" of the photosensitive monomer is independently selected from acrylate, methacrylate, vinyl, vinyloxy, propenyl ether or epoxy.

15. The method according to claim 13, wherein "RS" of the photosensitive monomer is selected from methylene, ethylene, 1-methylethylene or 1-hydroxy-ethyl.

16. The method according to claim 13, wherein "$A_1$" and "$A_2$" of the photosensitive monomer is independently selected from biphenyl-4,4'-diyl, thiobiphenyl-4,4'-diyl, biphenyl ether-4,4'-diyl, naphthalene-2,6-diyl, anthracene-2,6-diyl or 1,2-stilbene.

17. The method according to claim 13, wherein "$Z_1$" and "$Z_2$" of the photosensitive monomer is independently selected from caroboxyl, carbothio or amide.

18. The method according to claim 13, wherein the weight of the photosensitive monomers is less than about 10% of the total weight of the liquid crystal layer.

19. The method according to claim 13, wherein the weight of the photosensitive monomers is about 0.15% to 0.3% of the total weight of the total weight of the liquid crystal layer.

20. The method according to claim 13, wherein in the step of forming a stabilized alignment polymer, the light includes a UV-light.

* * * * *